United States Patent
Poydence et al.

(10) Patent No.: US 10,757,215 B2
(45) Date of Patent: Aug. 25, 2020

(54) ALLOCATION OF COMPUTING RESOURCES FOR A COMPUTING SYSTEM HOSTING MULTIPLE APPLICATIONS

(71) Applicant: Pivotal Software, Inc., San Francisco, CA (US)

(72) Inventors: Andrew Poydence, Erie, CO (US); Adam Hevenor, Denver, CO (US); Brady Love, Highlands Ranch, CO (US); Johanna Ratliff, Denver, CO (US)

(73) Assignee: Pivotal Software, Inc., San Francisco, CA (US)

( * ) Notice: Subject to any disclaimer, the term of this patent is extended or adjusted under 35 U.S.C. 154(b) by 72 days.

(21) Appl. No.: 16/130,897

(22) Filed: Sep. 13, 2018

(65) Prior Publication Data

US 2020/0092391 A1 Mar. 19, 2020

(51) Int. Cl.
  *G06F 15/173* (2006.01)
  *H04L 29/08* (2006.01)
  *G06F 9/54* (2006.01)
  *G06F 11/34* (2006.01)

(52) U.S. Cl.
  CPC .......... *H04L 67/2852* (2013.01); *G06F 9/542* (2013.01); *G06F 11/3476* (2013.01); *H04L 67/10* (2013.01)

(58) Field of Classification Search
  CPC ..... H04L 67/10; H04L 67/2852; G06F 9/542; G06F 11/3476
  USPC .......................... 709/202–203, 223–224, 252
  See application file for complete search history.

(56) References Cited

U.S. PATENT DOCUMENTS

| | | | |
|---|---|---|---|
| 6,016,529 A * | 1/2000 | Woodman | G06F 12/0864 707/999.1 |
| 6,802,067 B1 | 10/2004 | Camp et al. | |
| 6,961,753 B1 | 11/2005 | Osburn, III | |
| 7,039,743 B2 * | 5/2006 | Merkin | G06F 13/4081 702/127 |
| 7,194,543 B2 | 3/2007 | Robertson et al. | |
| 7,917,700 B2 * | 3/2011 | Irish | G06F 12/128 711/134 |

(Continued)

FOREIGN PATENT DOCUMENTS

EP 3049940 8/2016

OTHER PUBLICATIONS

Anonymous [online], "Binary Search Tree," Wikipedia Reference, [retrieved on: Nov. 5, 2019], Sep. 10, 2018, retrieved from: URL<https://en.wikipedia.org/w/index.php?title=Binary_search_tree&oldid=858890659>, 11 pages.

(Continued)

*Primary Examiner* — Bharat Barot
(74) *Attorney, Agent, or Firm* — Fish & Richardson P.C.

(57) ABSTRACT

Logs emitted in a cloud application platform can be cached. Log events emitted by one or more log emitters in the cloud application platform are received. Cache-allocation data that specifies, for each log emitter, a quota for storing log-event data for the log emitter is maintained. For each log emitter of a plurality of log emitters in the cloud application platform, a respective local cache of log events in computer memory is maintained. A global cache for all of the plurality of log emitters in the system is maintained. Each node in the global cache represents a different respective local cache.

20 Claims, 3 Drawing Sheets

(56) References Cited

U.S. PATENT DOCUMENTS

| | | | |
|---|---|---|---|
| 8,386,466 B2 | 2/2013 | Park et al. | |
| 8,527,458 B2 | 9/2013 | Park et al. | |
| 9,519,502 B2 * | 12/2016 | Guthrie | G06F 11/2035 |
| 9,985,821 B2 * | 5/2018 | Tse | H04L 67/10 |
| 10,394,716 B1 * | 8/2019 | Piry | G06F 9/3004 |
| 10,445,157 B2 * | 10/2019 | Bestfleisch | H04L 67/2842 |
| 2002/0065779 A1 | 5/2002 | Dutta | |
| 2005/0193222 A1 | 9/2005 | Greene | |
| 2010/0235494 A1 | 9/2010 | Sood et al. | |
| 2013/0290441 A1 | 10/2013 | Linden Levy | |
| 2016/0112475 A1 | 4/2016 | Lawson et al. | |
| 2016/0124742 A1 | 5/2016 | Rangasamy et al. | |
| 2018/0336078 A1 * | 11/2018 | Bestfleisch | G06F 9/542 |
| 2019/0132276 A1 * | 5/2019 | Scheiber | H04L 67/26 |
| 2019/0347124 A1 * | 11/2019 | Payet | G06F 9/467 |

OTHER PUBLICATIONS

PCT International Search Report and Written Opinion issued in International Application No. PCT/US2019/050464 dated Nov. 14, 2019, 20 pages.

* cited by examiner

ALLOCATION OF COMPUTING RESOURCES FOR A COMPUTING SYSTEM HOSTING MULTIPLE APPLICATIONS

TECHNICAL FIELD

This document describes logging of events in a computer server or system.

BACKGROUND

A log file is a file that can be used to record events that occur in an operating system or application, including messages generated, computer services accessed, etc. In a multi-tenant environment, each tenant, e.g., a hosted application, a micro-service, etc., can generate log events for different log files so that each tenant may have one associated log file.

Logging services in a multi-tenant environment can present scalability and availability problems as the number of tenants increases. For example, if one tenant begins to consume excessive amounts of logging resources, either in terms of storage space for the logs or delivery performance for transmitting the logs to a consuming application, the logging services available to other tenants can appear to degrade or disappear.

This problem may be referred to as the "noisy neighbor" problem, in which logging services for one tenant are affected by a possibly completely unrelated tenant on the same platform. The noisy neighbor problem is particularly difficult in cloud application platforms in which users, rather than operators of the platform, drive how many tenants there are as well as the volume and frequency of logs that applications on the platform will emit.

SUMMARY

This specification describes how a system can implement a logging subsystem using a global logging cache and respective local logging caches for each of a plurality of applications hosted in a multi-tenant computing environment. The techniques described below solve the noisy neighbor problem and make the system faster, more scalable, and more responsive.

In general, one innovative aspect of the subject matter described in this specification can be embodied in a system used for caching logs emitted in a cloud application platform. The system can include one or more computers and one or more storage devices storing instructions that are operable, when executed by the one or more computers, to cause the one or more computers to perform operations. The operations can include receiving, by a logging subsystem of the cloud application platform, log events emitted by one or more log emitters in the cloud application platform; maintaining cache-allocation data that specifies, for each log emitter, a quota for storing log-event data for the log emitter; maintaining, for each log emitter of a plurality of log emitters in the cloud application platform, a respective local cache of log events in computer memory, wherein each local cache for each log emitter comprises a respective local binary tree that maintains an ordering of the log events for the log emitter according to a date field each log event; maintaining a global cache for all of the plurality of log emitters in the system, wherein the global cache comprises a single global binary tree that maintains an ordering of the plurality of log emitters having local caches in the system according to a respective oldest cached log event associated with each log emitter; and wherein each node in the global cache represents a different respective local cache. Other embodiments of this aspect include corresponding methods, apparatus, and computer programs recorded on one or more computer storage devices, each configured to perform the actions of the system.

Implementations can include one, some, all, or none of the following features. The operations further comprise receiving, by the logging subsystem, a new log-event emitted by one of the log emitters; determining an application identifier for the new log-event; using the global binary tree to identify a local cache associated with the application identifier; and inserting the new log-event into the identified local cache such that the identified local cache maintains ordering of the log events for the log emitter according to a date field each log event. The operations further comprise determining that a size of the identified local cache plus a size of the new log-event is less than the corresponding quota specified in the cache-allocation-data; and responsive to determining that a size of the identified cache plus a size of the log-event is less than the corresponding quota specified in the cache-allocation-data, inserting the new log-event into the identified cache.

The operations further comprise determining that a size of the local identified cache plus a size of the log-event is greater than the corresponding quota specified in the cache-allocation-data; and responsive to determining that a size of the identified local cache plus a size of the log-event is greater than the corresponding quota specified in the cache-allocation-data removing an oldest log-event from the corresponding local cache; and inserting the new log-event into the identified cache. To remove an oldest log-event from the corresponding local cache, the operations further comprise iteratively removing the oldest log-event from the corresponding local cache until a size of the identified cache plus a size of the new log-event is less than the corresponding quota specified in the cache-allocation-data. To insert the new log-event into the identified cache comprises rebalancing the local binary tree of the local cache.

The operations further comprise: determining that a size of the global cache plus a size of the log-event is greater than one of the quotas specified in the cache-allocation-data; and responsive to determining that a size of the global cache plus a size of the log-event is greater than one of the quotas specified in the cache-allocation-data, removing an oldest log-event from the global cache. The specified quotas are measured in a bit-wise unit. The specified quotas are measured in a number-of-events unit. The operations further comprise modifying at least one of the quotas of the cache-allocation-data such that future insertions into corresponding local caches respect the modified quotas. Each log emitter is an application hosted by the cloud application platform or a component of the cloud application platform.

Particular embodiments of the subject matter described in this specification can be implemented so as to realize one or more of the following advantages, or other advantages. The technology of computer-resource allocation can be advanced, improving computers. In particular, a multi-tenant platform can solve the noisy neighbor problem by reducing or eliminating the degradation of logging services due to the volume of logs emitted by any one particular tenant. In a multi-tenant environment, separate caches may be assigned to each tenant for log storage, and the utilization of one cache can be separated from the other caches so that the activities of one tenant do not impact other tenants. Technology described in this document can be used to store logs in a way that supports quick access to fresh log events, and allows for rapid pruning of old log events. By storing log events in balanced, ordered trees, and organizing the local caches into a tree structure, queries for log events can be quickly processed and responded to. In particular, the techniques described below allow for fast identification of the oldest log entries across all tenants, which allows for rapid pruning of the entire global cache as a whole.

DESCRIPTION OF DRAWINGS

Like reference symbols in the various drawings indicate like elements

DETAILED DESCRIPTION

This document describes technologies for providing logging services for different tenants in a multi-tenant environment. First, a global cache for log files is organized into local caches, with a respective local cache for each tenant of the environment. The global cache is indexed with a global binary tree so that each local cache, and oldest log files among all local caches, can be quickly found. Each local cache is organized into a local binary tree that can conform to balance and sorting rules on insertion and deletion.

When a log event is generated and to be inserted into a local cache, the local binary tree can be pruned to make room, if needed. Because the local binary tree conforms to sorting and balancing rules, the oldest log events may be quickly identified and pruned, allowing for efficient operation of logging services in the multi-tenant environment.

Figure 1:
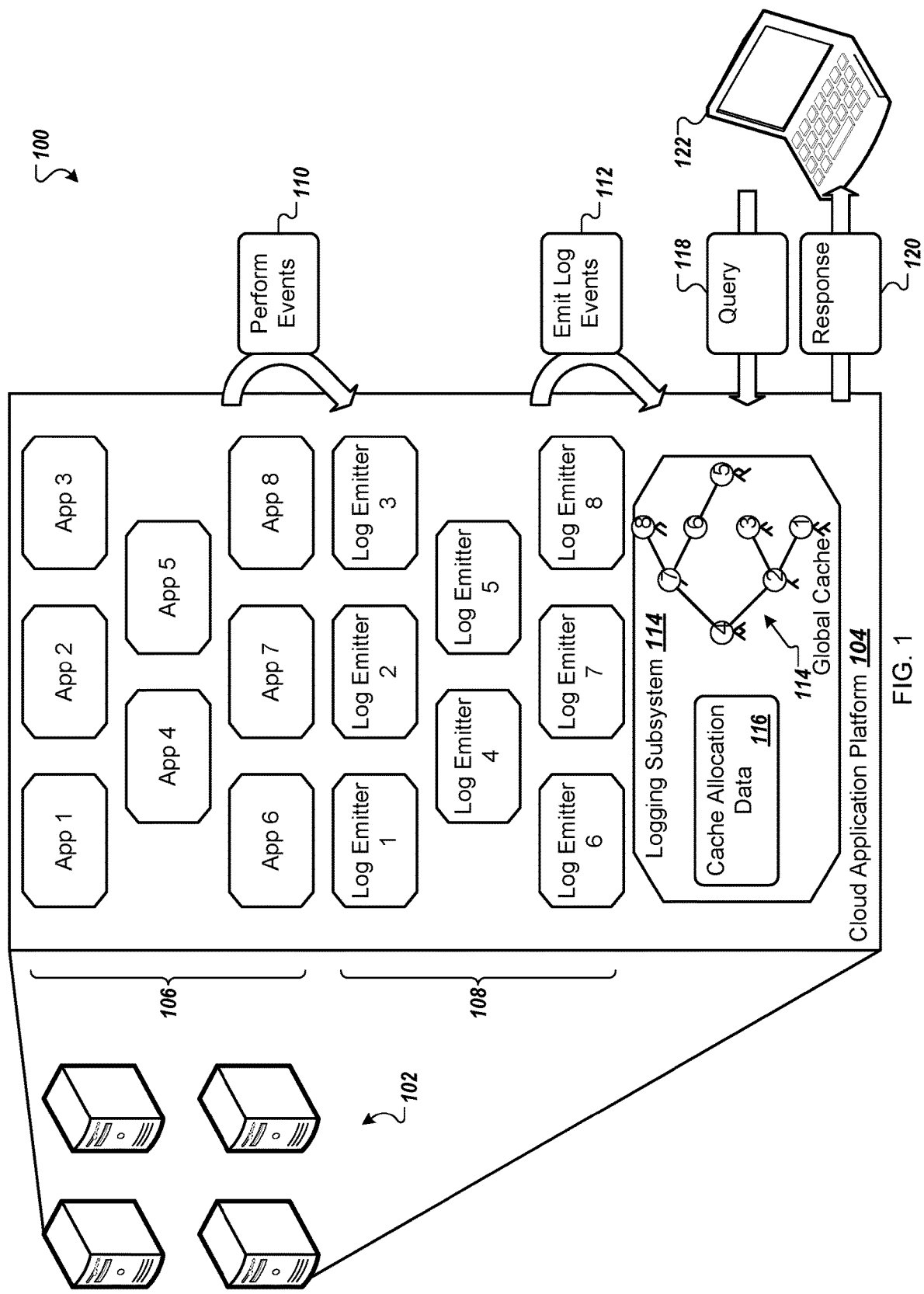
FIG. 1 shows a block diagram of an example system for caching logs emitted in a cloud application platform.

FIG. 1 shows a block diagram of an example system 100 for caching logs emitted in a cloud application platform 104. In this example, the system 100 can be used to host applications as tenants in a multi-tenant environment. In this example, the multi-tenant environment is a cloud application platform 104. A user of the system 100 can provide the cloud application platform 104 with one or more applications, and the cloud application platform 104 can host one or multiple instances the applications, which can work independently or together in order to perform tasks.

Computer hardware 102 includes one or more computing hardware-devices that work together to create the cloud application platform 104. The computing hardware 102 can include one or more physical servers that have computing processors, computer-readable memory, networking hardware, power management hardware, etc. The computing hardware 102 may all operate in one location, e.g., one datacenter, or may work together while operating in many locations, e.g., spread over multiple data centers. The computer hardware 102 can run operating systems and software in order to provide the cloud application platform 104. For example, the computer hardware 102 can execute virtual machines or containers in which components of the cloud application platform can be run.

The components of the cloud application platform may have access to limited amounts of computing resources, e.g., processor cycle time, memory access, network communication. For example, each environment may have a given amount of cache for the storage of log data. In some cases, each environment may be assigned the same amount of cache. For example, each environment may get one equal share of the cache. In some cases, different environments may have different amount of cache available. For example, cache space may be available in different sizes for different prices and the users may select the size and price that fits their needs.

The cloud application platform 104 can host cloud applications 106. In this example, eight cloud applications 106 are shown but other examples may have fewer or more cloud applications. The cloud applications 106 are each generally self-contained programs that perform some work on behalf of users that make or access them. In some cases, some of the cloud applications 106 can work together to complete some unified task made up of smaller work. For example, a translation service may use one cloud application 106 to parse text and then another cloud application 106 to translate each word. This type of architecture may be useful, for example, for complex tasks or for tasks that are built using already-available cloud applications 106. In order to accommodate increasing or decreasing demand, instances of cloud applications 106 can be started up and suspended as needed. For example, when additional requests for a cloud application 106 are generated, one or more new instances of the cloud application 106 can be started.

For each cloud application 106, the cloud application platform 104 includes a respective log emitter 108. The log emitters 108 can be cloud applications 106 or can be components of the underlying cloud application platform 104 that the applications 106 interface with. In any case, the log emitters 108 can monitor the actions of the respective cloud applications 106 and generate log events to record the actions of the cloud applications 106

As the cloud applications 106 run, the cloud applications 106 will perform events 110. These events can include any actions that are of interest in, for example, monitoring and, administrating, the cloud applications 106. Example performed events 110 include, but are not limited to, performing calculations, accessing memory, sending and receiving network data, beginning or terminating a user session, etc.

The log emitters can be configured to listen for particular performed events 110 and emit log events 112 in response. For example, a particular log emitter 108 may be configured to listen for memory access performed events 110 in a corresponding cloud application 106 and to emit log events 112 with a time stamp, memory address, and other specified metadata.

A logging subsystem 114 of the cloud application platform 104 can receive the log events emitted by the log emitters 108. For example, the logging subsystem 114 may include an interface to which each of the log emitters 108 sends a message when they emit log events 112, and the logging subsystem can receive those messages with the log events in them.

The logging subsystem 104 can maintain a global cache 114 to store the emitted log data. That is, the logging subsystem 114 can handle temporary storage of log data for the cloud applications 106 so that another system can access the log data. These other systems can collect the log data for long term storage, or may interact with the log data for other reasons while it is in the cache (e.g., to troubleshoot a cloud application 106.) This global cache 114 may be of a size specified in cache allocation data 116 in order to respect maximum memory usage of the computing hardware 102 that was allocated for use as log-data cache.

The logging subsystem 114 can maintain a global cache 114 for all of the log emitters 108. The global cache 114 can keep record of all log events, along with an index that allows for efficient searching of the log events across all log emitters 108. The global cache 114 includes a single global binary tree that maintains an ordering of the plurality of log emitters having local caches in the system according to a respective oldest cached log event associated with each log emitter. Each node in the global cache represents a different respective local cache. In some cases, the global binary tree may be an Adelson-Velsky and Landis (AVL) tree.

This can allow, for example, searching all log events in the global cache 114 to find the oldest log event emitted by any of the log emitters 108 and still stored in the global cache 114. For example, if the global binary tree is maintained so that nodes are moved to the rightmost leaf when the corresponding log emitters 108 emit a log event, finding the oldest log event involves finding the leftmost node in the global binary tree and then finding the oldest log event emitted by the corresponding log emitter 108.

The logging subsystem 114 can maintain, for each log emitter 108, a respective local cache of log events in computer memory. That is, each of the log emitters 108 may have a section of the global caches 114 set aside for that log emitter's 108 use to store log events. In this way, the global cache 114 can be made of the collection of local caches, optionally with other storage as well.

Each local cache for each log emitter 108 comprises a respective local binary tree that maintains an ordering of the log events for the log emitter according to a date field each log event. In some cases, the local binary tree may be an AVL tree.

This can allow, for example, searching all log events in in the local cache to find the oldest log event emitted by a single log emitter 108 and still stored in the local cache. For example, if the local binary tree is maintained so that the nodes for new log events are added as rightmost nodes, finding the oldest log event in the local cache involves finding the leftmost node.

The cloud application platform 104 maintains cache-allocation data 116 that specifies, for each log emitter 108, a quota for storing log-event data for the log emitter. In some implementations, the specified quotas are measured in a bit-wise unit. That is, a number of bits, bytes, megabytes, gigabytes, etc. In some implementations, the specified quotas are measured in a number-of-events unit. That is, a limit of N log events may be stored.

When a log event is received by the logging subsystem 114, it is inserted into the local cache, and thus the global cache. If the local cache is already at quota before the insertion, the logging subsystem 114 can prune the local cache by finding (see above) and discarding the oldest log event in the local cache. If the global cache is already at quota before insertion, the logging subsystem 114 can prune the global cache by finding (see above) and discarding the oldest log event in the global cache.

In some implementations, the cache allocation data 116 can be modified. Modifying at least one of the quotas of the cache allocation data 116 can update the cloud application platform 104 such that future insertions into corresponding local caches respect the modified quotas. For example, the operator of a particular cloud application 106 may decide that a larger or smaller local cache is needed and may contract for the larger or smaller local cache. The cloud application platform 104 can modify the quota for that cloud application 106 in order to carry out the new contracted local cache size.

With the log events stored in local caches in the global cache, the cloud application platform can use the caches when receiving a query 118 and responding 120. For example, a client device 122 can access a webpage that contains graphical user interface (GUI) elements to show log data from one of the cloud applications 106. The user may select a time window and ask to see the log events from that time window. The webpage may generate the query 118 asking for log events within the time window from the local cache associated with the cloud application 106. The logging subsystem 114 may search within the corresponding local cache for all log events within the time window and return them as the response 120 to the client device 122.

Figure 2:
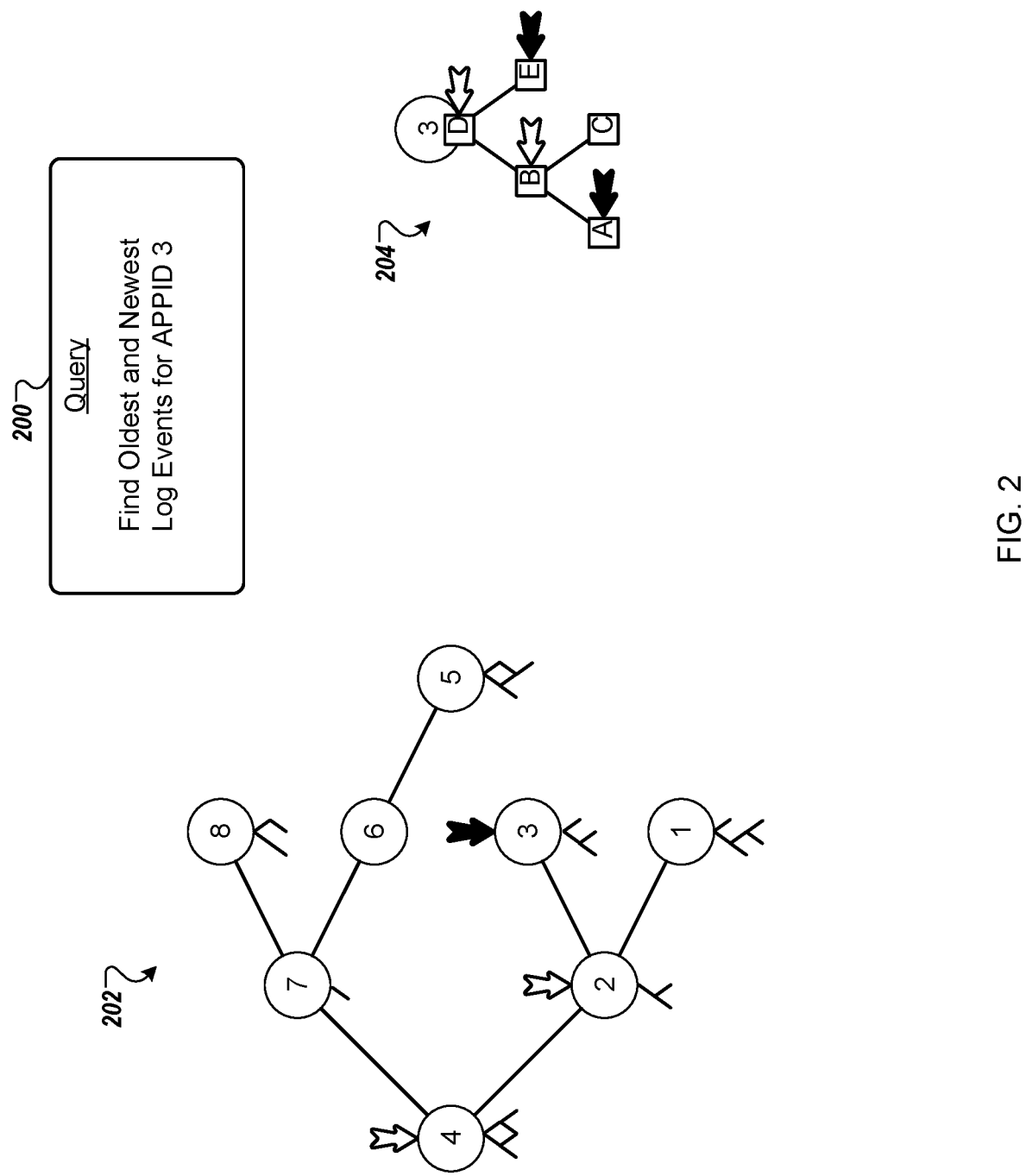
FIG. 2 shows a schematic diagram of example data used for responding to queries.

FIG. 2 shows a schematic diagram of example data structures used for responding to log queries. In the example shown here, a user is interested in finding the range of log events stored in the local cache for a given cloud application.

In order to find this range, a query 200 is generated requesting the oldest and newest log event for a particular cloud application identified by a variable "APPID." The query may take any appropriate form such as being written in a computer-readable language such as Structured Query Language (SQL) or another language.

To generate a response to the query, a logging system first searches within a global binary tree 202 to find a node having the same APPID as that identified in the query 200. In order to search, a search algorithm matching the format of the global binary tree 202 is used. As shown, this search begins with the root node, then traverses left and then right to arrive at the node for the local cache associated with the log emitter and cloud application of the same APPID. The node in the global cache then identifies the root node of the corresponding local cache.

Once the local cache is identified, the local binary tree 204 is searched for log events that match the requirements of the query 200. In this instance, the oldest and newest log events are requested by the query 200.

Because the local binary tree is sorted by date of entry, in order to locate the oldest entry, the local binary tree 204 is traversed left repeatedly until a leaf is found. However, if a different sorting scheme is used, a different search algorithm for the oldest log entry may be used.

In order to locate the newest entry, the local binary tree 204 is traversed right repeatedly until a leaf is found. However, if a different sorting scheme is used, a different search algorithm for the newest log entry may be used.

Figure 3:
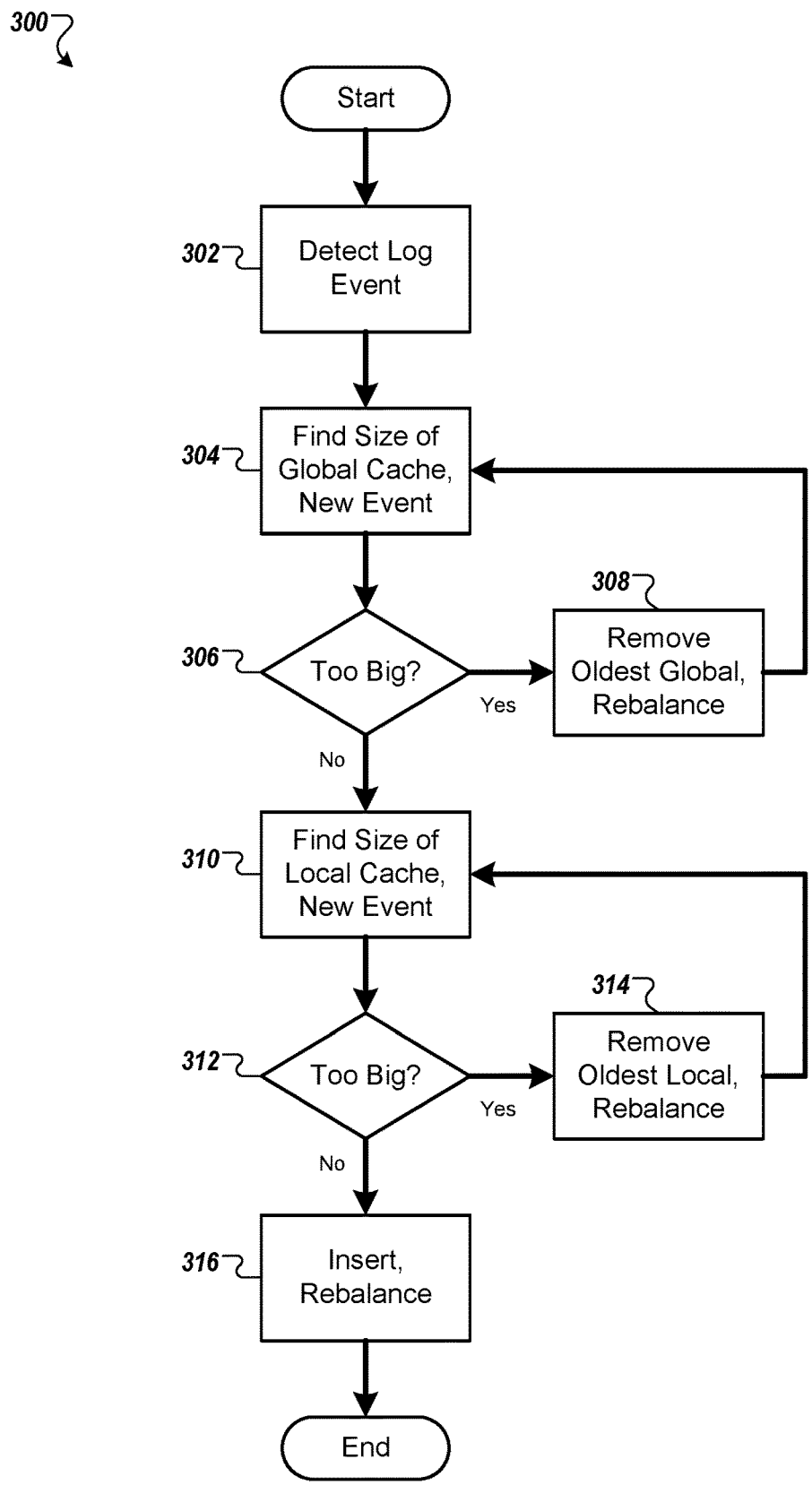
FIG. 3 shows a flowchart of an example process for caching logs emitted in a cloud application platform.

FIG. 3 shows a flowchart of an example process 300 for caching logs emitted in a cloud application platform. The process 300 may be performed by, for example, the system 100 and as such, the example here will be described with reference to elements of the system 100. However, another system or systems may be used to perform the process 300 or another similar process.

In this example, a cloud application 106 is running on the cloud application platform 104 to perform speech-recognition operations. The cloud application 106 is provided with audio recordings of a speaker, and the cloud application 106 generates a text file with the most probably text to match the speaking. In the course of this operation, the cloud application 106 performs events 110 that a log emitter 108 listens for. For example, when a translation is completed, metadata of the translation (e.g., timestamp, language model used, confidence level, processor cycles used) is captured by the log emitter 108 and a log event is emitted 112 with this metadata. These logs events will be used later by the administrator of the cloud application 106 to tune the language models available to the cloud application 106. The rate of creation for these log-events can be a function of the usage of the cloud application 106. During times of low usage, relatively few log-events are generated, but later when usage increases, the system can begin to generate more and more log-events.

Log events are detected 302. For example, responsive to the log being emitted by the log emitter 108, the logging subsystem 114 can receive the new log event. This log event may be received through an interface used by the log emitter 108 and all the other log emitters 108 of the cloud application 104. The logging subsystem 114 may perform intake operations such as verifying that the log event came from an authorized source, the log event can be placed in a queue of new log events, etc.

Sizes of the global cache and the new event are found 304. For example, in order to ensure that the global cache does not grow larger than an allocated size in computer-memory of the computer hardware 102, the logging subsystem 114 can identify the size of the log event. In some cases, this may be a count of log events in a single message (i.e., a count of 1, in this example of the speech-recognition). In some cases, this may be a bit-wise measure (e.g., a size of 8 bytes, in this example of the speech-recognition.) The remainder of this example will be described using a bit-wise measure.

If the sizes of the global cache and the new event are too large 306, the oldest log event in the global cache is removed and the global cache is rebalanced 308. For example, the logging subsystem 114 may a first determine if the size of the global cache plus a size of the log-event is greater than one of the quotas specified in the cache-allocation-data. The logging subsystem may look up the amount of memory currently used by the global cache and add the size of the new message, which is 8 bytes. This combined size can be compared with a global-cache-quota stored in the cache allocation data.

If the combined size is greater than the quota; or greater than or equal to the quota; the logging subsystem 114 can remove the oldest log-event from the global cache. For example, this may result in a log generated by one application causing a log-event from another application being removed to make room. By removing the oldest log-event in the system, the least-needed log-event can thus be removed to make room for a fresher log-event.

In order to do so, the logging subsystem 114 may search the global binary tree to find the oldest log event stored in any local cache. With the global binary tree maintained so that a local cache's node is moved to the rightmost position when a log event is written, finding the oldest event in the cache involves finding the leftmost node in the global binary tree to find the local cache with the oldest log event. Then, if the local binary tree is organized the same way, the leftmost node in the local binary tree contains the oldest log event.

After removing the oldest log-event from the global cache, the global-cache-tree can be rebalanced or otherwise updated so that it conforms to the constraints on the global-cache-tree imposed by the system. For example, a minimum balance requirement may be used to ensure that the global-cache-tree does not become too sparse and thus too deep in some branches, which can have a negative impact on system performance.

If this removal causes the combined size of the global cache and the new log-event to be less than; or less and or equal too; the global-cache-quota, the process 300 can advance to 310. If this removal does not cause the combined size of the global cache and the new log-event to be less than; or less and or equal too; the global-cache-quota, the process 300 can repeat 308 until the quota size is reached.

If the sizes of the global cache and the new event are not too large 306, the size of the local cache and the new event are found 310. For example, the logging system can use the global binary tree to identify a local cache associated with the application identifier of the new event. This identifying can include searching the global binary tree with a search algorithm designed for use in binary trees of the type of the global binary tree.

In order to ensure that the local cache does not grow larger than an allocated size in computer-memory of the computer hardware 102, the logging subsystem 114 can identify the size of the log event plus a size of the identified local cache. This combined value can be compared with a quota stored in the cache allocation data 116.

If the sizes of the local cache and the new event are too big 312, the oldest log event in the local cache is removed and the local cache is rebalanced 314. For example, if the combined size is greater than the quota of the cache allocation data 116, the logging subsystem can, in response, remove an oldest log-event from the corresponding local cache. In order to do so, the logging subsystem 114 may search the local binary tree to find the oldest log event stored in the local cache that was identified. After removing the oldest log-event from the identified local cache, the local-cache-tree can be rebalanced or otherwise updated so that it conforms to the constraints on the local-cache-tree imposed by the system. For example, a minimum balance requirement may be used to ensure that the local-cache-tree does not become too sparse and thus too deep in some branches, which can have a negative impact on system performance.

In order to remove an oldest log-event from the corresponding local cache, the logging subsystem 114 can iteratively remove the oldest log-event from the corresponding local cache until a size of the identified cache plus a size of the new log-event is less than the corresponding quota specified in the cache-allocation-data.

If the sizes of the local cache and the new event are not too big 312, the new event is inserted into the local cache and the local cache is rebalanced 316. For example, the local-cache-tree may be organized so that the newest log events are inserted as a right-most leaf of the tree. In such a case, the logging subsystem 114 may traverse the local-cache-tree right repeatedly until an existing leaf is found. Then, that leaf may be given a new right-hand child for the new log event.

After inserting the new log event into the identified local cache, the local-cache-tree can be rebalanced or otherwise updated so that it conforms to the constraints on the local-cache-tree imposed by the system. For example, a minimum balance requirement may be used to ensure that the local-cache-tree does not become too sparse and thus too deep in some branches, which can have a negative impact on system performance.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

What is claimed is:

1. A system for caching logs emitted in a cloud application platform, the system comprising one or more computers and one or more storage devices storing instructions that are operable, when executed by the one or more computers, to cause the one or more computers to perform operations comprising:

receiving, by a logging subsystem of the cloud application platform, log events emitted by one or more log emitters in the cloud application platform;

maintaining, by the cloud application platform, cache-allocation data that specifies, for each log emitter, a quota for storing log-event data for the log emitter;

maintaining, for each log emitter of a plurality of log emitters in the cloud application platform, a respective local cache of log events in computer memory, wherein each local cache for each log emitter comprises a respective local binary tree that maintains an ordering of the log events for the log emitter according to a date field of each log event;

maintaining, by the logging subsystem of the cloud application platform, a global cache for all of the plurality of log emitters in the system, wherein the global cache comprises a single global binary tree that maintains an ordering of the plurality of log emitters having local caches in the system according to a respective oldest cached log event associated with each log emitter; and wherein each node in the global cache represents a different respective local cache.

2. The system of claim 1, wherein the operations further comprise:

receiving, by the logging subsystem, a new log-event emitted by one of the log emitters;

determining an application identifier for the new log-event;

using the global binary tree to identify a local cache associated with the application identifier; and inserting the new log-event into the identified local cache such that the identified local cache maintains ordering of the log events for the log emitter according to a date field each log event.

3. The system of claim 2, wherein the operations further comprise:

determining that a size of the identified local cache plus a size of the new log-event is less than the corresponding quota specified in the cache-allocation-data; and responsive to determining that a size of the identified cache plus a size of the log-event is less than the corresponding quota specified in the cache-allocation-data, inserting the new log-event into the identified cache.

4. The system of claim 2, wherein the operations further comprise:

determining that a size of the local identified cache plus a size of the log-event is greater than the corresponding quota specified in the cache-allocation-data; and responsive to determining that a size of the identified local cache plus a size of the log-event is greater than the corresponding quota specified in the cache-allocation-data:

removing an oldest log-event from the corresponding local cache; and inserting the new log-event into the identified cache.

5. The system of claim 4, wherein to remove an oldest log-event from the corresponding local cache, the operations further comprise iteratively removing the oldest log-event from the corresponding local cache until a size of the identified cache plus a size of the new log-event is less than the corresponding quota specified in the cache-allocation-data.

6. The system of claim 4, wherein to insert the new log-event into the identified cache comprises rebalancing the local binary tree of the local cache.

7. The system of claim 2, wherein the operations further comprise:

determining that a size of the global cache plus a size of the log-event is greater than one of the quotas specified in the cache-allocation-data; and responsive to determining that a size of the global cache plus a size of the log-event is greater than one of the quotas specified in the cache-allocation-data, removing an oldest log-event from the global cache.

8. The system of claim 1, wherein the specified quotas are measured in a bit-wise unit.

9. The system of claim 1, wherein the specified quotas are measured in a number-of-events unit.

10. The system of claim 1, wherein the operations further comprise modifying at least one of the quotas of the cache-allocation-data such that future insertions into corresponding local caches respect the modified quotas.

11. The system of claim 1, wherein each log emitter is an application hosted by the cloud application platform or a component of the cloud application platform.

12. A method for caching logs emitted in a cloud application platform, the method comprising:
    receiving, by a logging subsystem of the cloud application platform, log events emitted by one or more log emitters in the cloud application platform;
    maintaining, by the cloud application platform, cache-allocation data that specifies, for each log emitter, a quota for storing log-event data for the log emitter;
    maintaining, for each log emitter of a plurality of log emitters in the cloud application platform, a respective local cache of log events in computer memory, wherein each local cache for each log emitter comprises a respective local binary tree that maintains an ordering of the log events for the log emitter according to a date field of each log event;
    maintaining, by the logging subsystem of the cloud application platform, a global cache for all of the plurality of log emitters in the system, wherein the global cache comprises a single global binary tree that maintains an ordering of the plurality of log emitters having local caches in the system according to a respective oldest cached log event associated with each log emitter; and
    wherein each node in the global cache represents a different respective local cache.

13. The method of claim 12, further comprising:
    receiving, by the logging subsystem, a new log-event emitted by one of the log emitters;
    determining an application identifier for the new log-event;
    using the global binary tree to identify a local cache associated with the application identifier; and
    inserting the new log-event into the identified local cache such that the identified local cache maintains ordering of the log events for the log emitter according to a date field each log event.

14. The method of claim 13, further comprising:
    determining that a size of the identified local cache plus a size of the new log-event is less than the corresponding quota specified in the cache-allocation-data; and
    responsive to determining that a size of the identified cache plus a size of the log-event is less than the corresponding quota specified in the cache-allocation-data, inserting the new log-event into the identified cache.

15. The method of claim 13, further comprising:
    determining that a size of the local identified cache plus a size of the log-event is greater than the corresponding quota specified in the cache-allocation-data; and
    responsive to determining that a size of the identified local cache plus a size of the log-event is greater than the corresponding quota specified in the cache-allocation-data:
        removing an oldest log-event from the corresponding local cache; and
        inserting the new log-event into the identified cache.

16. The method of claim 15, wherein to remove an oldest log-event from the corresponding local cache, the method further comprises iteratively removing the oldest log-event from the corresponding local cache until a size of the identified cache plus a size of the new log-event is less than the corresponding quota specified in the cache-allocation-data.

17. The method of claim 15, wherein inserting the new log-event into the identified cache comprises rebalancing the local binary tree of the local cache.

18. The method of claim 13, further comprising:
    determining that a size of the global cache plus a size of the log-event is greater than one of the quotas specified in the cache-allocation-data; and
    responsive to determining that a size of the global cache plus a size of the log-event is greater than one of the quotas specified in the cache-allocation-data, removing an oldest log-event from the global cache.

19. The method of claim 12, wherein the specified quotas are measured in a bit-wise unit.

20. One or more non-transitory computer storage media encoded with computer program instructions that when executed by one or more computers cause the one or more computers to perform operations comprising:
    receiving, by a logging subsystem of a cloud application platform, log events emitted by one or more log emitters in the cloud application platform;
    maintaining, by the cloud application platform, cache-allocation data that specifies, for each log emitter, a quota for storing log-event data for the log emitter;
    maintaining, for each log emitter of a plurality of log emitters in the cloud application platform, a respective local cache of log events in computer memory, wherein each local cache for each log emitter comprises a respective local binary tree that maintains an ordering of the log events for the log emitter according to a date field of each log event;
    maintaining, by the logging subsystem of the cloud application platform, a global cache for all of the plurality of log emitters in the system, wherein the global cache comprises a single global binary tree that maintains an ordering of the plurality of log emitters having local caches in the system according to a respective oldest cached log event associated with each log emitter; and
    wherein each node in the global cache represents a different respective local cache.

* * * * *